United States Patent
Papasakellariou

(10) Patent No.: US 9,838,980 B2
(45) Date of Patent: Dec. 5, 2017

(54) WIDEBAND REFERENCE SIGNAL TRANSMISSION IN SC-FDMA COMMUNICATION SYSTEMS

(75) Inventor: Aris Papasakellariou, Athens (GR)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 13/104,862

(22) Filed: May 10, 2011

(65) Prior Publication Data

US 2011/0212745 A1 Sep. 1, 2011

Related U.S. Application Data

(62) Division of application No. 11/927,148, filed on Oct. 29, 2007, now Pat. No. 7,957,759.

(60) Provisional application No. 60/869,255, filed on Dec. 8, 2006.

(51) Int. Cl.
| | |
|---|---|
| H04B 7/00 | (2006.01) |
| H04B 1/00 | (2006.01) |
| H04B 17/00 | (2015.01) |
| H04W 52/32 | (2009.01) |
| H04L 27/26 | (2006.01) |
| H04W 52/36 | (2009.01) |
| H04L 5/00 | (2006.01) |

(52) U.S. Cl.
CPC ........... *H04W 52/32* (2013.01); *H04L 5/0048* (2013.01); *H04L 27/261* (2013.01); *H04W 52/36* (2013.01); *H04L 5/0007* (2013.01); *H04L 5/0037* (2013.01)

(58) Field of Classification Search
CPC .................................................. H04W 52/146
USPC .................... 375/260; 370/203; 455/422.1
See application file for complete search history.

(56) References Cited

U.S. PATENT DOCUMENTS

| | | | |
|---|---|---|---|
| 7,426,175 | B2 | 9/2008 | Zhuang et al. |
| 7,957,759 | B2 | 6/2011 | Papasakellariou |
| 8,094,638 | B2 * | 1/2012 | Muharemovic et al. ..... 370/342 |
| 2002/0082013 | A1 * | 6/2002 | Lee ........................ H04W 52/40 455/436 |
| 2002/0115460 | A1 * | 8/2002 | Rune ....................... H04W 52/40 455/522 |
| 2004/0170157 | A1 * | 9/2004 | Kim et al. ..................... 370/349 |
| 2005/0043051 | A1 * | 2/2005 | Takano .................. H04W 52/40 455/522 |
| 2005/0169165 | A1 * | 8/2005 | Cimini et al. ................ 370/206 |
| 2005/0226140 | A1 * | 10/2005 | Zhuang et al. ............... 370/203 |
| 2006/0018411 | A1 * | 1/2006 | Gore et al. .................... 375/340 |
| 2006/0050799 | A1 * | 3/2006 | Hou et al. ..................... 375/260 |
| 2006/0153282 | A1 | 7/2006 | Jung et al. |

(Continued)

Primary Examiner — Tilahun B Gesesse
(74) Attorney, Agent, or Firm — Schwegman Lundberg & Woessner, P.A.

(57) ABSTRACT

Embodiments of the invention provide methods for transmitting reference signals (RS) from user equipments (UEs) in wireless communication systems. These RS are used, among other functions, by a serving base station to schedule data transmission from UEs and perform power and timing control of the UE signal transmissions. The RS are constructed based on constant amplitude zero autocorrelation (CAZAC) sequences, including their possible modifications. The invention describes methods to multiplex transmission of RS from multiple UEs by having the serving base station control the CAZAC sequence and the associated cyclic shift, transmission bandwidth, transmission period, and transmission power applied to the RS transmission by each UE.

10 Claims, 9 Drawing Sheets

(56) References Cited

U.S. PATENT DOCUMENTS

| | | |
|---|---|---|
| 2007/0171995 A1* | 7/2007 | Muharemovic et al. ..... 375/260 |
| 2007/0189404 A1* | 8/2007 | Baum et al. ................... 375/260 |
| 2007/0195906 A1* | 8/2007 | Kim et al. .................... 375/267 |
| 2008/0039098 A1 | 2/2008 | Papasakellariou et al. |
| 2008/0045260 A1* | 2/2008 | Muharemovic et al. ..... 455/522 |
| 2008/0051125 A1 | 2/2008 | Muharemovic et al. |
| 2008/0075184 A1 | 3/2008 | Muharemovic et al. |
| 2008/0101306 A1 | 5/2008 | Bertrand et al. |
| 2008/0107086 A1 | 5/2008 | Fukuta et al. |
| 2008/0214198 A1 | 9/2008 | Chen et al. |
| 2008/0318528 A1 | 12/2008 | Hooli et al. |
| 2008/0318608 A1 | 12/2008 | Inoue et al. |
| 2009/0175159 A1 | 7/2009 | Bertrand et al. |

\* cited by examiner

WIDEBAND REFERENCE SIGNAL TRANSMISSION IN SC-FDMA COMMUNICATION SYSTEMS

CLAIM OF PRIORITY UNDER 35 U.S.C. §119

The present Application for Patent is a Divisional of application 11/927,148 filed Oct. 27, 2007 now U.S. Pat. No. 7,957,759 which claims priority to United States Provisional Application Number 60/869,255 entitled "Wideband Reference Signal Transmission in SC-FDMA Communication Systems" filed Dec. 8, 2006.

BACKGROUND

Embodiments of the invention are directed, in general, to wireless communication systems and, more specifically, to reference signal, also commonly referred to as pilot signal, transmission with wideband occupancy in multi-user wireless communications systems.

The disclosed invention considers as an exemplary embodiment a single-carrier frequency division multiple access (SC-FDMA) communications system as it is known in the art and further considered in the development of the 3GPP long term evolution (LTE). The invention assumes the uplink (UL) communication corresponding to the signal transmission from mobile user equipments (UEs) to a serving base station (Node B). The UEs scheduled for UL communication by the Node B (typically through control signaling in the downlink (DL) of the communication system, that is the communication from the Node B to UEs), are assumed to transmit a signal over a transmission time interval (TTI) corresponding to a sub-frame. This signal comprises of data and possibly of control information. In addition, in order to assist with the demodulation of the transmitted data, reference signals (RS), also known as pilots, are transmitted by each UE having an UL data transmission and occupy substantially the same bandwidth as the transmitted data signal. These demodulation RS will be referred to as DM RS.

FIG. 1 shows an exemplary sub-frame structure 110. The sub-frame comprises of four "short blocks (SBs)" 120 and twelve "long blocks (LBs)" 130 where the SB duration is practically half the LB duration. In the exemplary embodiment, the LB duration is assumed to be 66.67 microseconds (μsec). The DM RS is assumed to be transmitted in the SBs while the data is assumed to be transmitted in the LBs. However, this is only an exemplary generic setup and the 4 SBs may instead be replaced by 2 LBs in which case everything, including the DM RS, is transmitted in LBs. In addition to the time dimension, the transmission bandwidth (BW) is assumed to comprise of frequency resource units which will be referred to as resource blocks (RBs). UEs can be allocated a multiple N of consecutive RBs for their data transmission. In the example of FIG. 1, one LB RB is assumed to comprise of 12 sub-carriers 140 and one SB RB of 6 sub-carriers 150 (due to the fact that the SB duration is half the LB one). In addition, the LBs and SBs also include a cyclic prefix (not explicitly shown), as it is conventionally known for SC-FDMA and in general OFDM-based communication systems.

In order for the Node B to determine the RBs where a UE transmits its data signal and the modulation and coding scheme (MCS) used for the data transmission, a channel quality indicator (CQI) estimate is needed per RB of the scheduling BW or the total operating BW. The scheduling BW can be smaller than or equal to the total operating BW. This CQI estimate is obtained through the UE transmission of a wideband RS (CQI RS). The CQI RS (also referred to as sounding RS) may be transmitted in one or more LBs (CQI RS LBs) per multiple sub-frames replacing the data. As the CQI RS represents overhead, the CQI RS LB insertion rate should be minimized. FIG. 2 shows an exemplary structure with the CQI RS LB 210 inserted every 2 sub-frames 220, representing approximately 4.3% overhead. In addition to providing a CQI estimate, the CQI (sounding) RS may also serve for the purposed of transmission power control and transmission timing adjustments for the UEs.

The exemplary embodiment of the invention considers that the DM RS and CQI RS are constructed from a class of "Constant Amplitude Zero Auto-Correlation—CAZAC" sequences such as the Zadoff-Chu (ZC) sequences as proposed in TI-61162. An example for the construction CAZAC sequences are given by the following expression:

$$c_k(n) = \exp\left[\frac{j2\pi k}{L}\left(n + n\frac{n+1}{2}\right)\right].$$

In the above formula, L is the length of the CAZAC sequence, n is the index of a particular element of the sequence n={0, 1, 2 . . . , L−1}, and finally, k is the index of the sequence itself. For a given length L, there are L−1 distinct sequences, provided that L is prime. Therefore, the entire family of ZC sequences is defined as k ranges in {1, 2 . . . , L−1}. For ZC sequences of prime length L, the number of ZC sequences is L−1. Therefore, the larger the ZC length, the larger the number of such sequences, and the possible/easier the cell planning for allocating different ZC sequences to adjacent Node Bs for use by the DM RS. FIG. 3 illustrates the allocation principle of different ZC sequences (or, in general, CAZAC sequences) 310-370 to adjacent Node Bs. Alternatively, different ZC sequences can be respectively allocated to different cells of the same Node B in addition to different Node Bs.

In addition to using different ZC sequences, different cyclic shifts 410-440 of the same ZC sequence can be used to actually provide orthogonal RS in the code domain as proposed in TI-61162. This is illustrated in FIG. 4. In order for multiple RS generated from the same ZC sequence through correspondingly multiple cyclic shifts to be orthogonal, the cyclic shift value Δ450 should exceed the channel propagation delay spread D. For this reason, only a small number of cyclic shifts are possible, and if $T_{LB}$ is the LB duration, the number of cyclic shifts for the CQI RS is equal to the mathematical floor of the ratio $T_{LB}/D$, assuming that the same cyclic shift value corresponding to a large delay spread is allocated to the CQI RS transmitted by all UEs regardless of the channel delay spread each such UE experiences.

In general, the larger the transmission BW of the CQI RS, the less accurate the CQI estimate becomes as the CQI RS power is spread over a wider BW. For UEs located near the cell edge that experience large propagation path losses in their transmitted signal, and therefore have low signal-to-interference and noise ratio (SINR) at the Node B receiver, this means large CQI inaccuracies if the CQI RS is transmitted over a wide BW. To improve the accuracy of the CQI estimate and the Node B scheduling decisions, the CQI RS from cell edge UEs should be typically transmitted over a smaller scheduling BW than the total available BW. For UEs located in the Node B interior, the opposite applies, and the CQI RS should be typically transmitted over the entire operating BW to maximize throughput gains from channel dependent frequency domain scheduling. Therefore, a mixture of CQI RS transmission BWs may need to be supported in a CQI RS LB.

As ZC sequences of different lengths are not orthogonal, CQI RS with different transmission BW, transmitted in the same CQI RS LB, need to occupy different sub-carriers (spectral combs) and therefore frequency division multiplexing (FDM) is applied. However, with FDM, the length the ZC sequence is typically short and therefore very few ZC sequences exist for allocation in neighboring Node Bs. For this reason, the multiplexing is typically a combination of FDM and CDM or pure CDM, with CDM referring to the use of different cyclic shifts of the same ZC sequence (code division multiplexing). The transmitter structures and corresponding CQI RS spectrums with CDM and FDM are shown in FIG. 5 and FIG. 6, respectively.

With the RS transmitter structure in FIG. 5, after the ZC sequence is generated 510, a cyclic shift (including a zero cyclic shift) may be subsequently applied 520. The cyclic shift may be prior to the Discrete Frequency Transform (DFT) operation 530 (as shown in FIG. 5) or after the Inverse Fast Fourier Transform (IFFT) operation 550 (the modification should be obvious as it involves just moving the corresponding block after the IFFT one). Subsequently, the time domain signal is converted to a frequency domain one through the application of a DFT operation 530 as it is known in the art. A pulse shaping filter may also be applied at the DFT output (not shown). The sub-carrier mapping operation 540 simply places the transmitted sub-carriers into the selected frequency band (RB) and is followed by the IFFT operation 550 and the Cyclic Prefix (CP) insertion 560. The reverse functions are performed at the receiver. The spectrum occupancy 570 is continuous.

The main difference between the transmitter structure in FIG. 6 and the one in FIG. 5 is that in the former the ZC sequence 610 (after the cyclic shift is applied 620) is repeated in time by a repetition factor (RPF) 630. Repetition in time produces in frequency a comb signal spectrum. The number of empty sub-carriers between two combs is equal to RPF minus one. Therefore, for RPF of 3, there will be two empty sub-carriers between two consecutive combs. If the CQI RS transmitted by all UEs occupies the same BW, no multiplexing of different BWs is necessary, and the transmitter structure in FIG. 5 may be used as it provides more ZC sequences and, due to continuous spectrum occupancy, it provides better immunity to interference as the CQI RS transmission power is spread over a larger number of sub-carriers. Similarly to the modification mentioned for FIG. 5, the comb spectrum may be generated directly in the frequency domain 650 and the cyclic shift may be applied after the IFFT 660.

When CQI RS from multiple UEs occupy more than one scheduling BWs, the multiplexing of orthogonal CQI RS is assumed to be achieved through a hybrid of CDM and FDM. CQI RS multiplexing through CDM is achieved through cyclic shifts of the same ZC sequence. Multiplexing of CQI RS through FDM is achieved by having the CQI RS occupy different combs of the spectrum. For example, UE transmitters as in FIG. 6 can be used to multiplex a number of orthogonal CQI RS equal to the number of cyclic shifts (for the same ZC sequence) providing immunity from the channel delay spread experienced from each CQI RS transmitted by UEs (CDM component). By providing a comb spectrum for the resulting CQI RS, other CQI RS can be transmitted in the unoccupied part of the spectrum (FDM component). The CQI RS occupying different parts of the spectrum may or may not use the same ZC sequence and may or may not occupy the same scheduling BW.

Based on previous discussion, it becomes apparent that there is a need for UEs to construct and transmit CQI (sounding) reference signal occupying a large bandwidth, not necessarily during a single transmission instance, in order to enable the serving Node B to perform frequency selective channel dependent scheduling in the uplink of wireless communication systems.

There is another need for the serving Node B to signal to the UEs the bandwidth over which to transmit the CQI (sounding) reference signal.

There is another need for the serving Node B to signal to the UEs parameters required for multiplexing the CQI (sounding) reference signals from a plurality of UEs over the same transmission bandwidth.

There is another need for the serving Node B to power control the transmission of CQI (sounding) reference signals as they may constitute interference to adjacent cells or Node Bs.

There is another need to randomize the interference experienced by the CQI (sounding) reference signals in order to provide an accurate measure for the estimated channel response.

There is another need to co-ordinate orthogonal transmission of CQI (sounding) reference signals from multiple UEs.

SUMMARY

In light of the foregoing background, embodiments of the invention provide a signaling method and system for multiplexing reference signals from multiple user equipments (UEs) for channel quality indication (CQI), transmission power control, and transmission timing adjustments, in the uplink of communication systems. Embodiments of the invention also describe the signaling associated with the multiplexing and co-ordination of the transmission of CQI reference signals from multiple UEs.

One embodiment of the invention describes the signaling associated with the selection of the sequence used to generate the CQI reference signal from transmitting UEs.

Other embodiments of the invention describe the signaling associated in order to orthogonally multiplex CQI reference signal transmission from a plurality of UEs over the time, frequency, and code domains by correspondingly specifying the transmission period, transmission frequency sub-carrier (or comb), and cyclic shift of the CQI reference signals.

Yet another embodiment of the invention describes the signaling associated with setting the nominal power of the CQI reference signal transmitted by each respective UE so that a desired reception quality is achieved for the CQI reference signal without unnecessarily increasing the associated interference.

System and method of embodiments of the present invention solve problems identified by prior techniques and provide additional advantages.

BRIEF DESCRIPTION OF THE DRAWINGS

Figure 1:
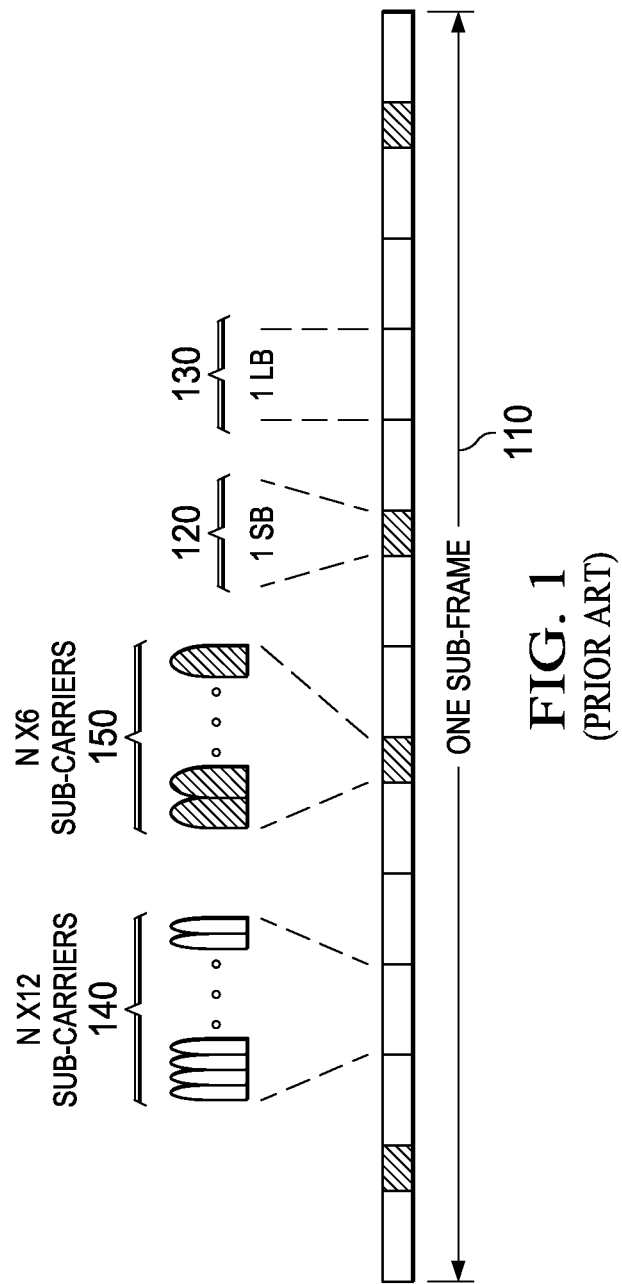
Figure 2:
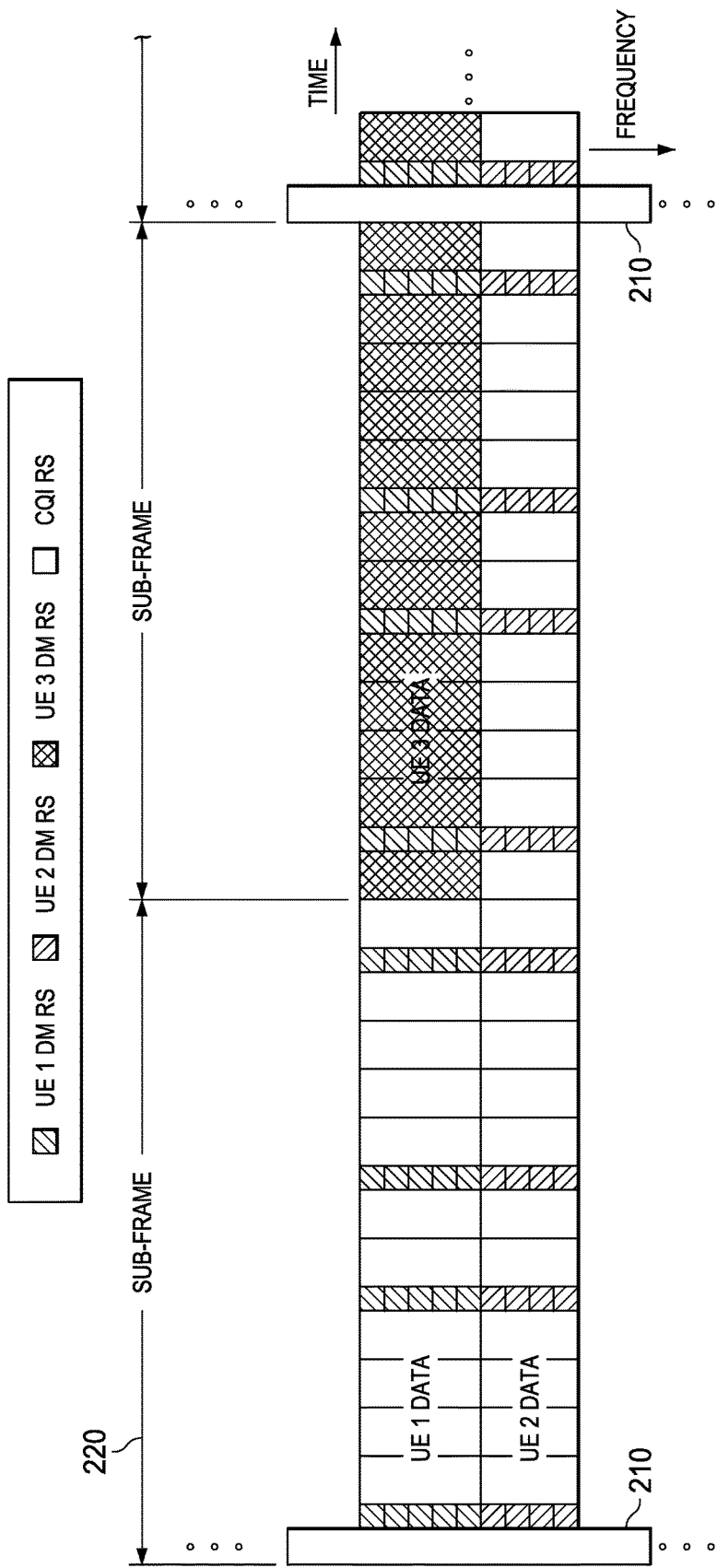
Figure 3:
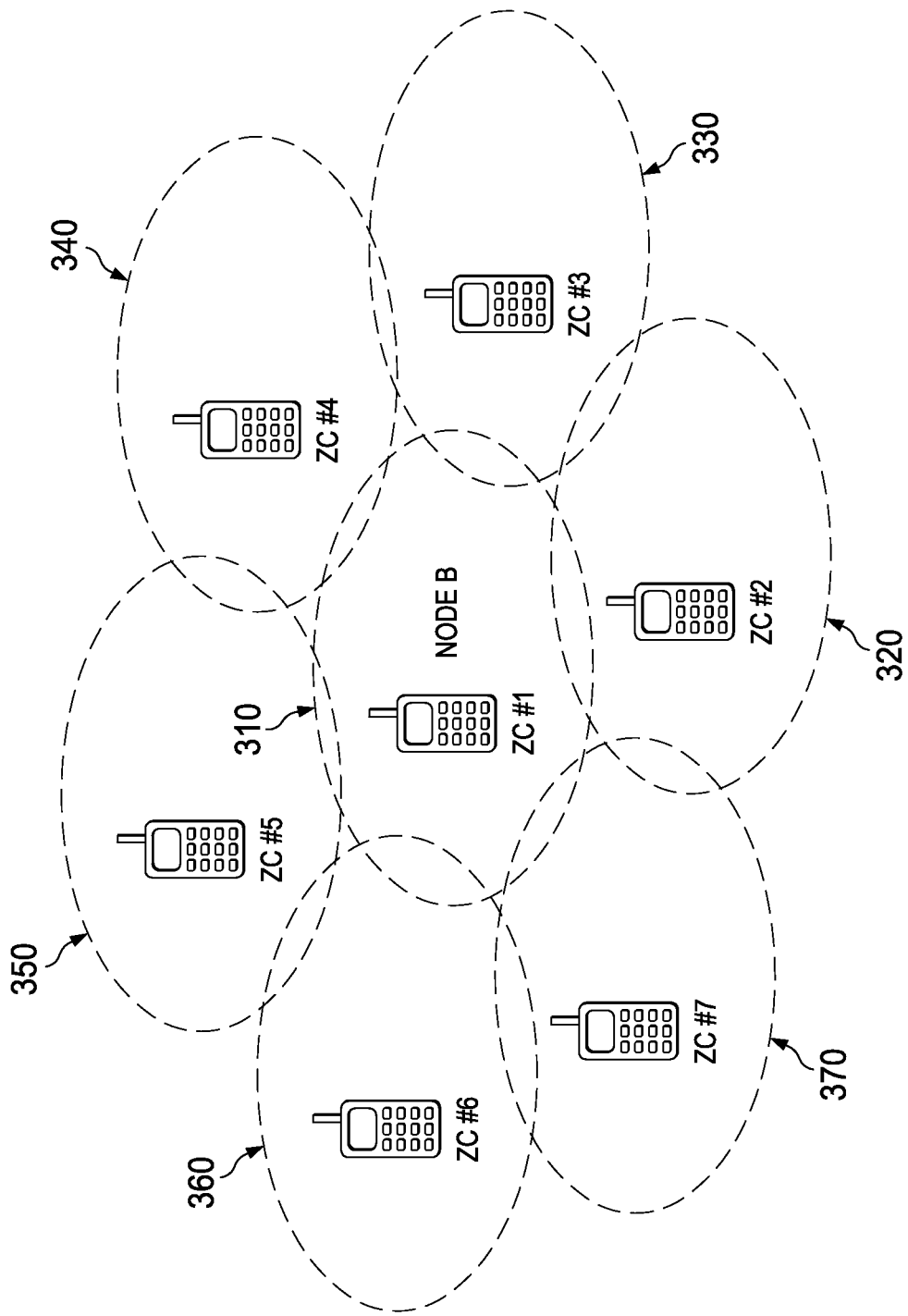
Figure 4:
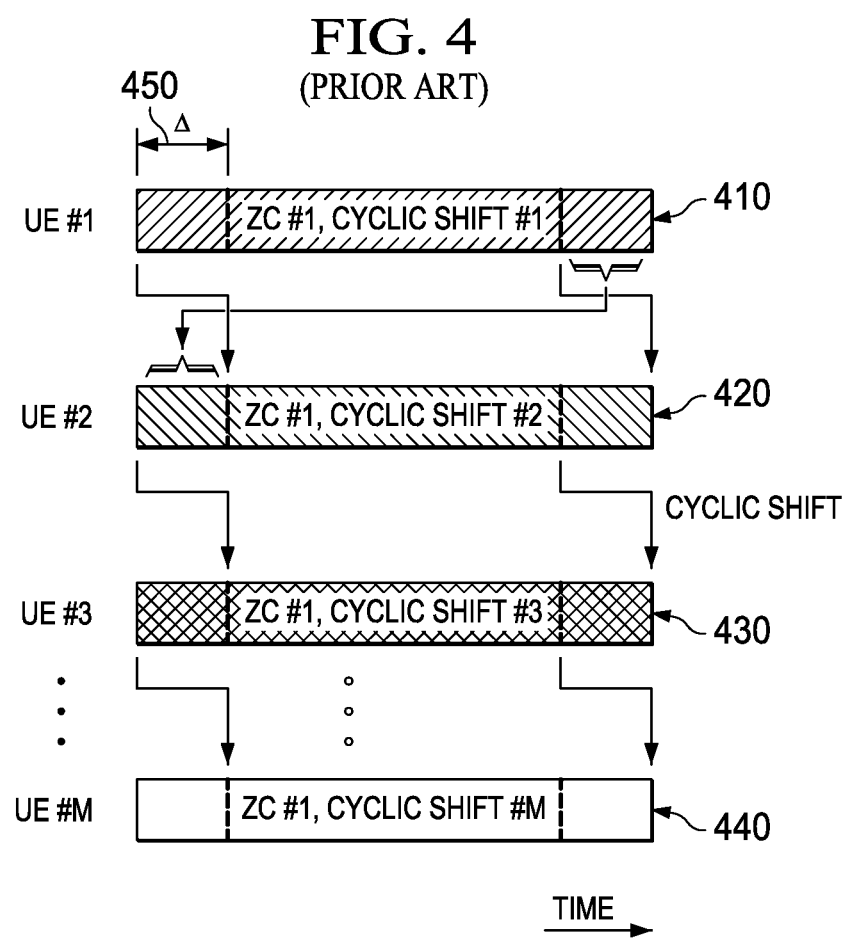
Figure 5:
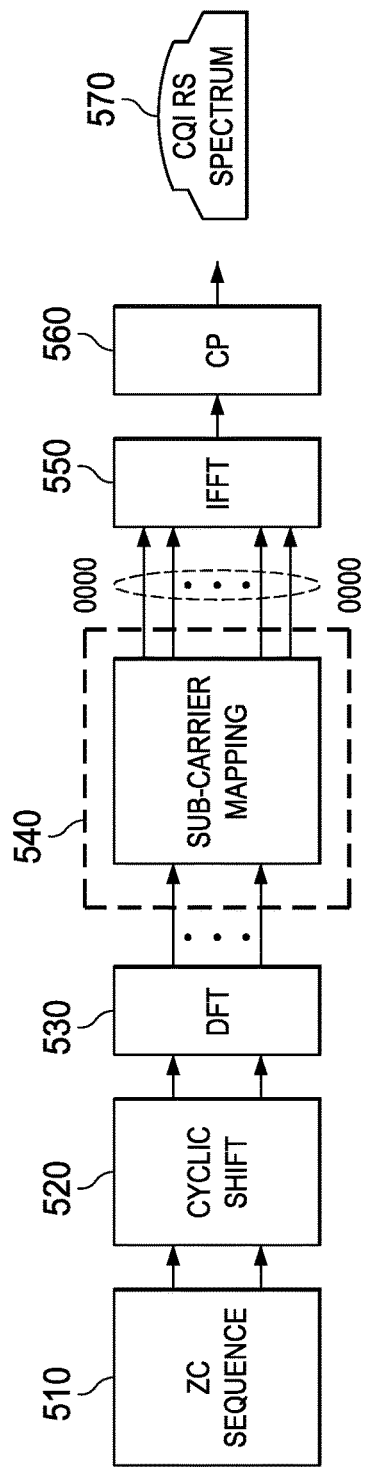
Figure 6:
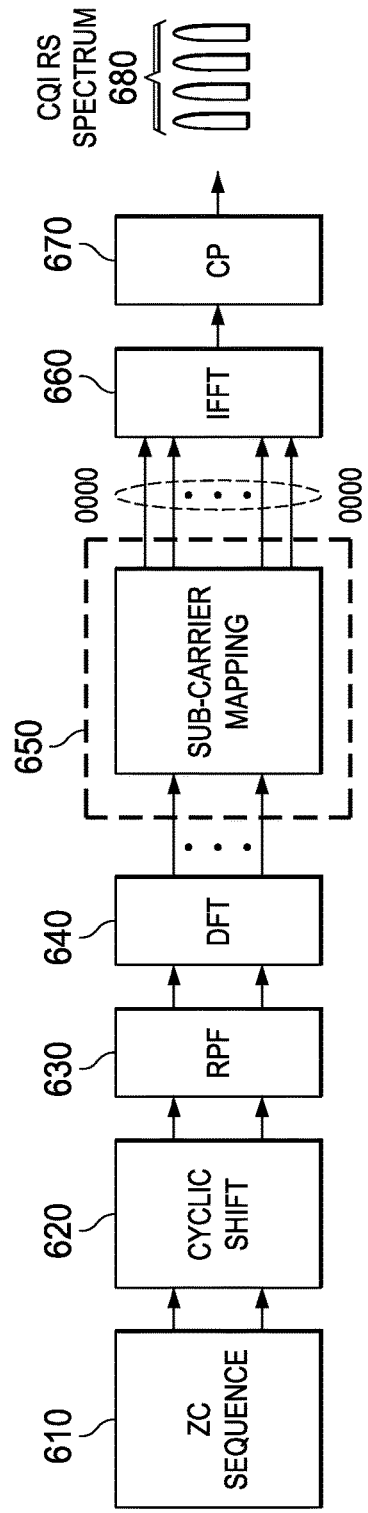
Figure 7:
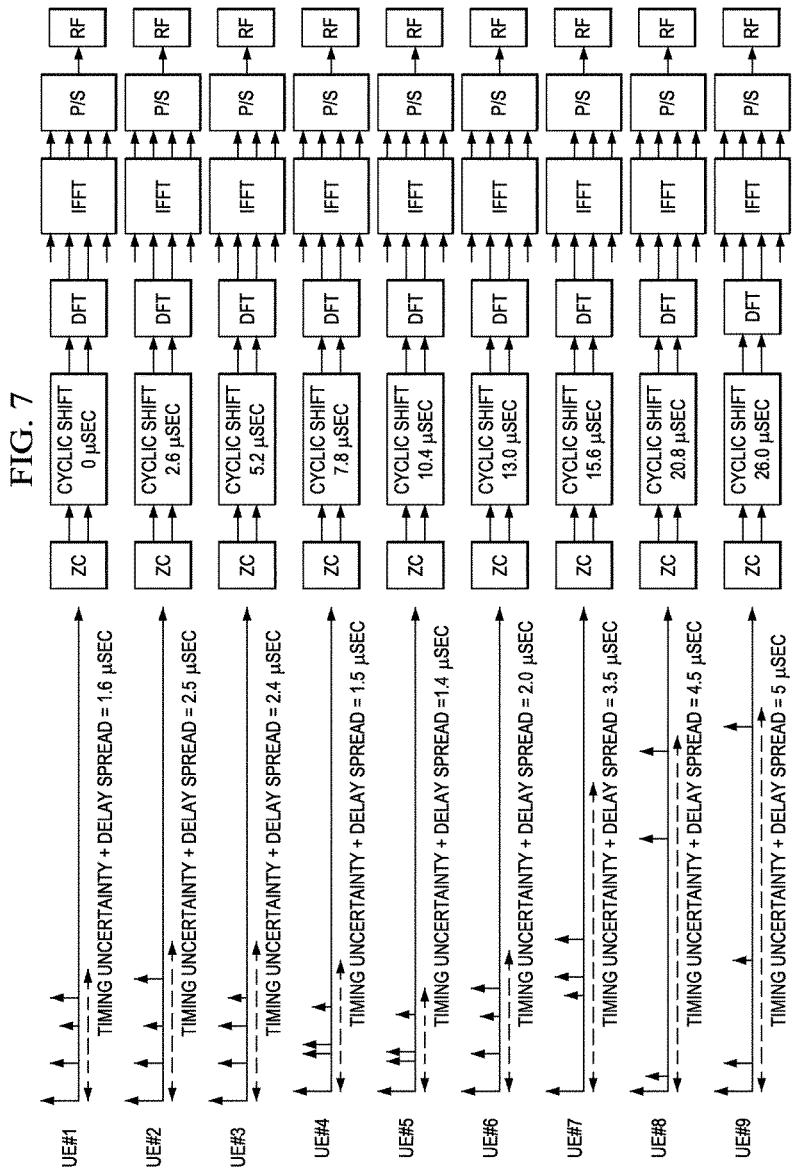
Figure 8:
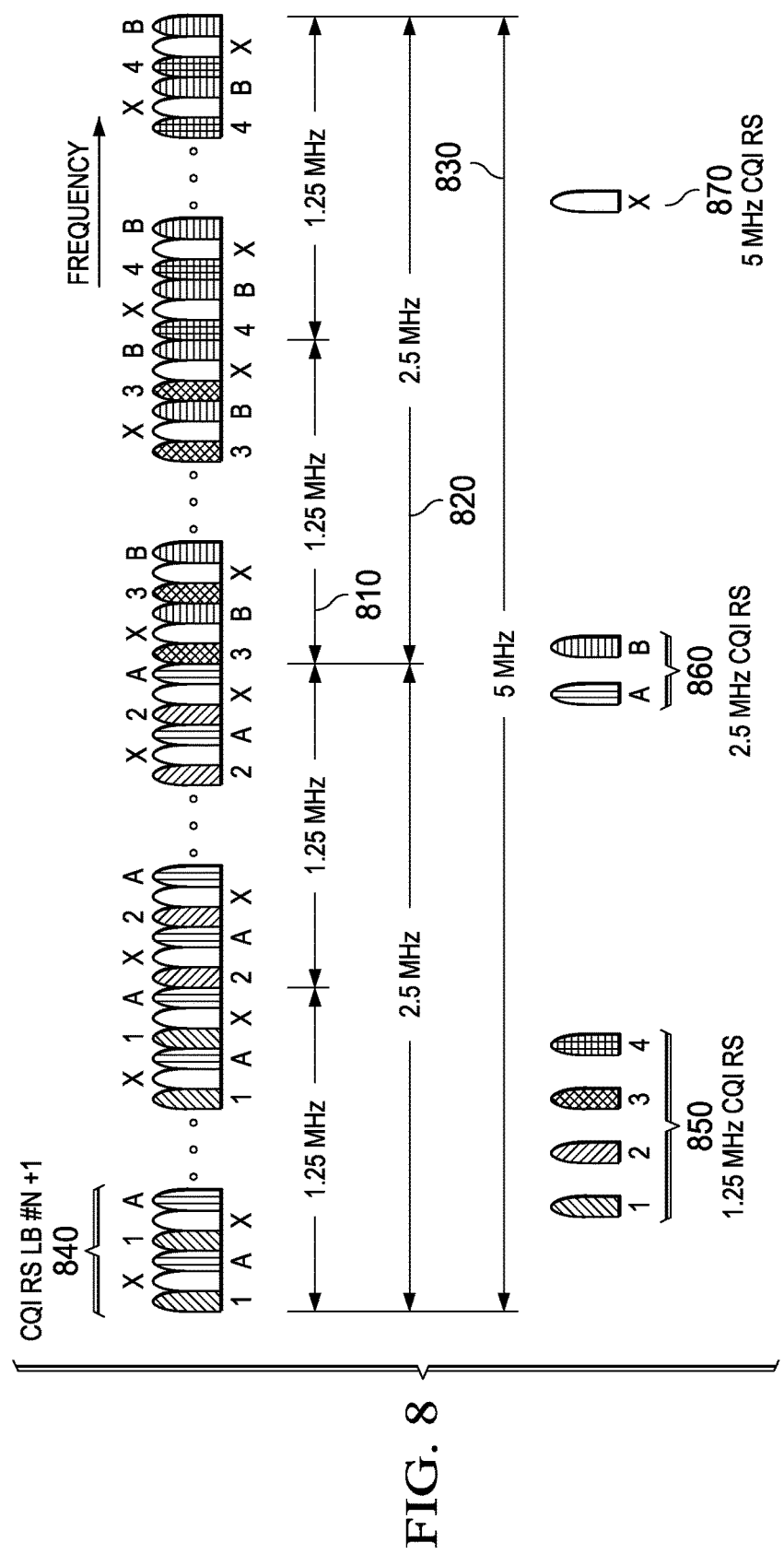
Figure 9:
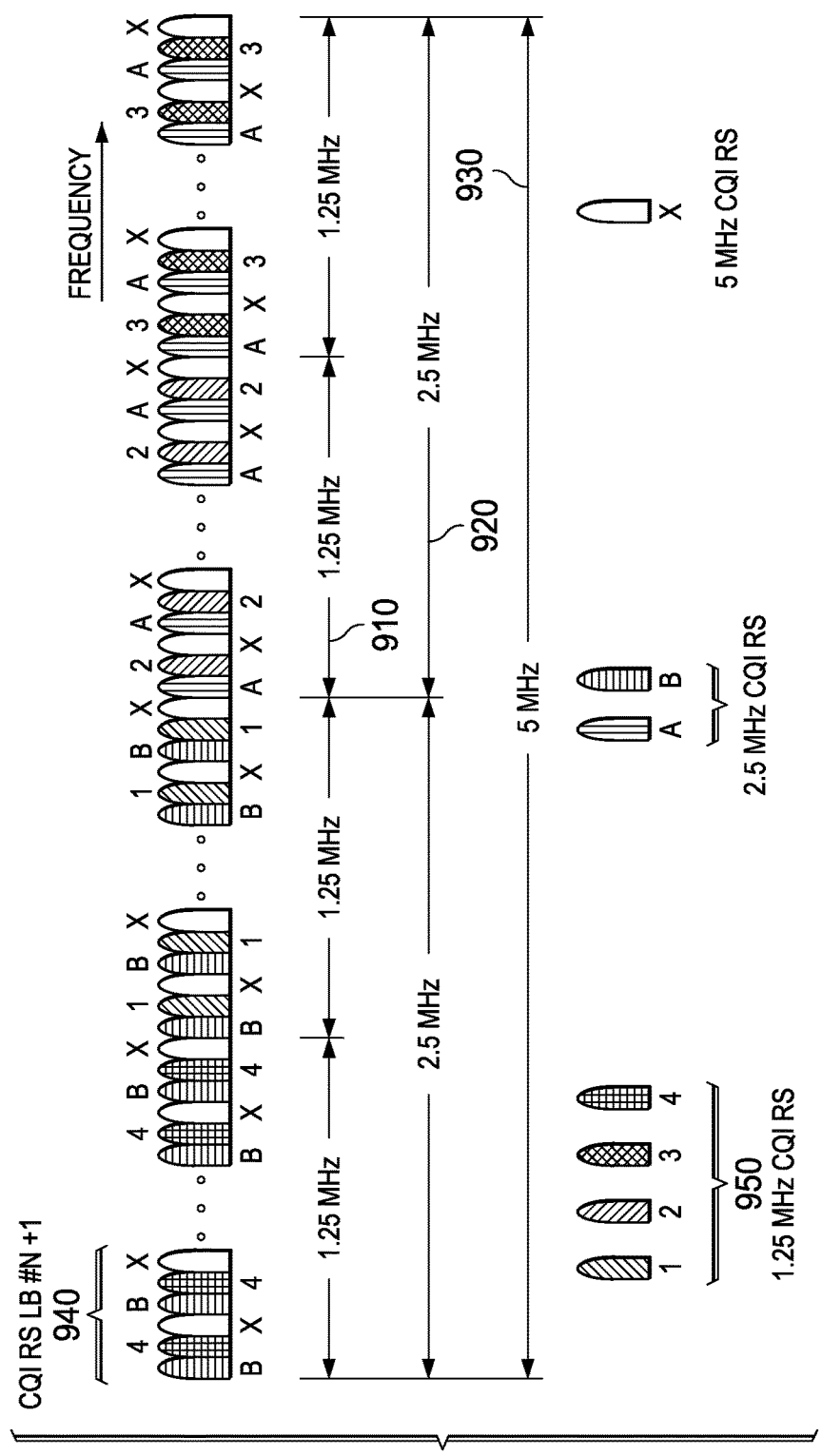
Figure 10:
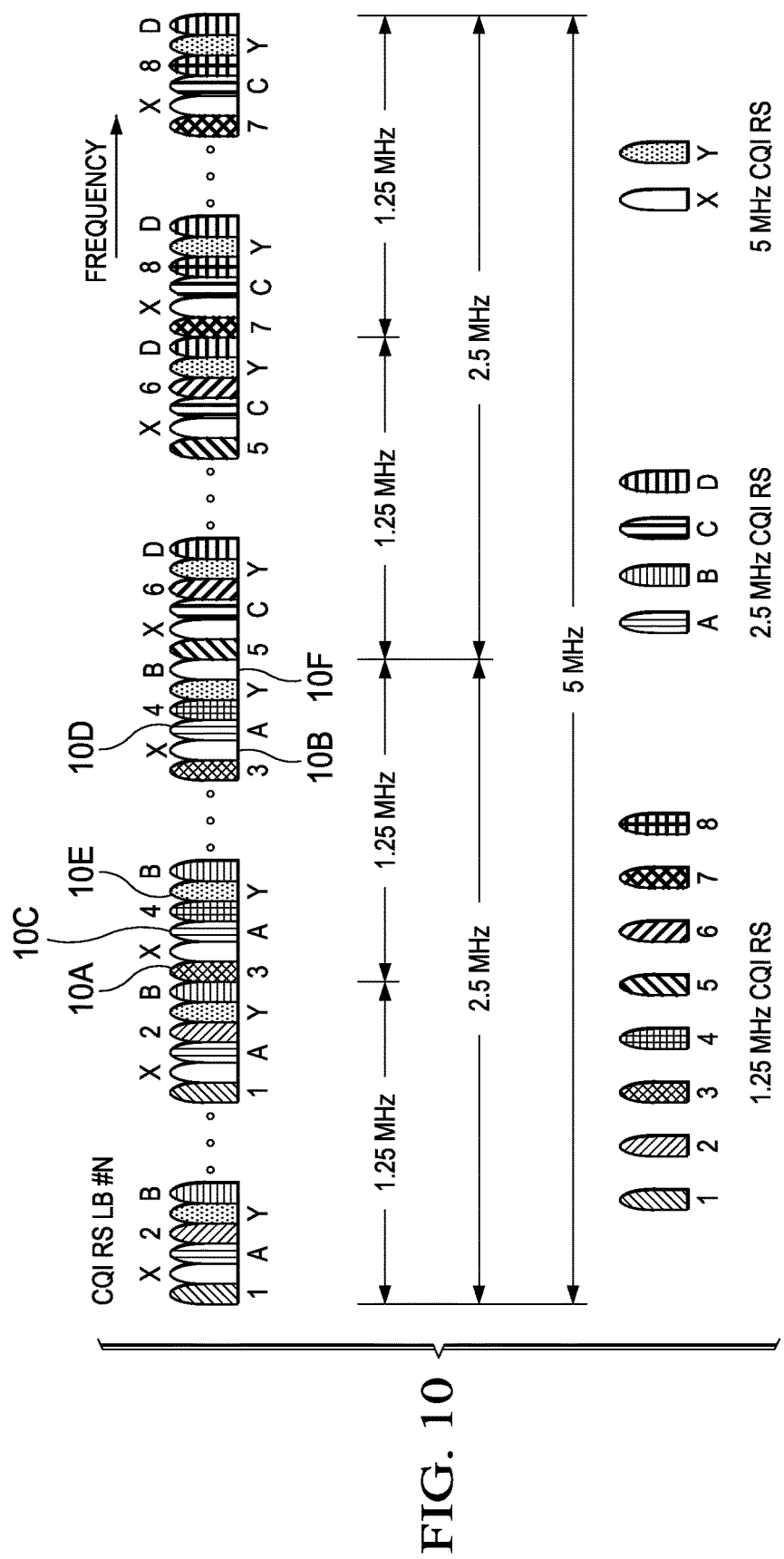

Having thus described the invention in general terms, reference will now be made to the accompanying drawings, which are not necessarily drawn to scale, and wherein:

FIG. 1 is a diagram illustrative of an exemplary communication sub-frame;

FIG. 2 is a diagram illustrative of an exemplary placement of a CQI (or sounding) RS in transmission blocks of communication sub-frames;

FIG. 3 is a diagram illustrative of an exemplary allocation of Zadoff-Chu based sequences used for CQI RS generation in adjacent Node Bs;

FIG. 4 is a diagram illustrative of the application of cyclic shifts on the Zadoff-Chu based sequence used for CQI RS generation in order to orthogonally multiplex CQI RS transmission from multiple user equipments in the code domain;

FIG. 5 is a diagram illustrative of an exemplary generation of CQI RS resulting to continuous spectrum;

FIG. 6 is a diagram illustrative of an exemplary generation of CQI RS resulting to comb spectrum;

FIG. 7 is a diagram showing an allocation of cyclic shifts for the CQI RS from multiple UEs;

FIG. 8 is a diagram showing a first method for orthogonally multiplexing CQI RS transmission from multiple user equipments in the frequency domain;

FIG. 9 is a diagram showing a second method for orthogonally multiplexing CQI RS transmission from multiple user equipments in the frequency domain; and FIG. 10 is a diagram showing a third method for orthogonally multiplexing CQI RS transmission from multiple user equipments in the frequency domain.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The UL CQI RS transmission should be optimized to most efficiently utilize the UL BW while minimizing and simplifying the associated DL control signaling and enabling transmission from a large number of UEs, depending on the operating BW. One embodiment of the invention is the periodic CQI RS transmission from UEs having UL transmissions. The period of the CQI RS transmission is configured by the Node B through explicit signaling to a UE and can be different among UEs.

With periodic CQI RS transmission, a UE is given a set of CQI RS parameters to use at specific periodic time instances (CQI RS LBs). The Node B configures the CQI RS transmission rate and BW based on the data scheduling type (distributed, localized, persistent), the frequency selectivity of the channel, and the received SINR. These are determined after the random access channel (RACH) conveying a communication request from a UE is received at the Node B. Using the RACH, the Node B can determine the path loss, the Doppler shift, and the delay spread. For example, with distributed scheduling, which substantially relies on frequency diversity, the CQI RS transmission rate can be relatively low (e.g. every 10 msec). For localized scheduling, which substantially relies on selecting a continuous set of RBs with good SINR, the CQI RS may use all or a part of the total BW, depending on the UE SINR conditions, and its transmission rate should be high (for example, every 4 msec). With persistent scheduling, where a scheduling assignment is valid over several sub-frames, the CQI RS may be arranged shortly prior to the scheduling assignment. Also, for a UE experiencing flat channel conditions, both the CQI RS transmission BW and rate can be low. The opposite apply for frequency selective channels.

At first, the assignment of the CQI RS parameters to a UE are communicated by the Node B through signaling the Node B transmits to a UE after the RACH reception by the Node B. This signaling may be through the RACH response message to the UE, through the control channel, or through higher layer signaling using the data channel. Subsequently, to account for varying conditions, such as for example an improvement or degradation in the UE SINR due to shadowing variations, the Node B may re-configure the CQI RS parameters either through the control channel or through higher layer signaling using the data channel. In addition to the changing conditions for a specific UE, re-configuration may also occur as a result of changing overall system conditions such as the number of UEs that need to transmit a CQI RS. The CQI RS configuration parameters are identified in the remaining of this invention.

The number of UEs that need to have CQI RS transmission can be as large as 200/400 UEs per cell for a 5/10 MHz operating BW. The CQI RS transmitted by multiple UEs over the same scheduling BW should be orthogonal. Otherwise, the CQI RS interference will create CQI and timing estimation errors particularly in conjunction with "near-far" effects especially if only slow power control is used and if corresponding slow power control errors are considered. Ideally, CQI RS orthogonality should not be limited only to one cell but instead it should also be at the intra-Node B level, implying an increase in the number of orthogonal CQI RS by at least a factor of 3 (for 3 adjacent cells of a Node B). Moreover, an additional increase by a factor of 2 occurs with support of single user multiple-input multiple output (SU-MIMO) antenna methods or antenna selection transmitter diversity. Therefore, for 10 MHz, the total maximum of orthogonal CQI RS is about 1200 (2400) without (with) SU-MIMO or Tx diversity.

Orthogonal CQI RS with CDM/FDM can be achieved by combining the two options. Using CDM, orthogonal CQI RS are obtained by applying cyclic shifts to the ZC sequence. As the CQI RS is transmitted in an LB having duration of 66.67 μsec, a maximum of 12 cyclic shifts with fixed increments of 5.5 μsec can be obtained to statically protect against a large delay spread (such as for the Typical Urban (TU) channel) while accommodating for a typically large timing error of 0.5 μsec.

Using FDM, orthogonal CQI RS are obtained using the repetition factor (RPF). To account for the frequency selectivity of the channel, the maximum RPF can be 12 which for a sub-carrier spacing of 15 KHz implies a CQI RS sub-carrier every 180 KHz. However, this would result into a single CQI RS sub-carrier per RB (RB size is 180 KHz) making the CQI estimation per RB susceptible to interference and create interference spikes as the power is concentrated on very few sub-carriers. Also, with RPF of 12, the number of ZC sequences for the smaller scheduling BWs (1.25 MHz) becomes excessively small.

Finally, CQI RS from different UEs may also be transmitted at different time instances, thereby also introducing the time dimension for orthogonal CQI RS multiplexing for UEs having the same serving Node B.

Having a large number of ZC sequences is desirable for cell planning but also for selecting a subset of them with the smaller cross-correlations and peak-to-average power ratio (PAPR) or cubic metric (CM) properties to respectively minimize interference and optimize the efficiency of the transmitter amplifier.

Orthogonal CQI RS can also be achieved with pure FDMA by limiting the scheduling BW. For example, the number of orthogonal RS that can be obtained for a scheduling BW of 1.25 MHz is 8 times as large as the corresponding one for a scheduling BW of 10 MHz. However, limiting the scheduling BW leads to throughput losses for UEs in good SINR conditions.

Orthogonal CQI RS can also be achieved through pure TDMA by increasing the CQI RS LB rate. However, 1 LB for CQI RS every 2 milliseconds (msec) creates a corresponding overhead of about 4.25% and increasing the CQI RS LB rate proportionally increases the overhead and decreases throughput.

Therefore, the options of FDMA and TDMA to increase the number of orthogonal CQI RS should be used only when all other alternatives have been exhausted. For heavily loaded systems, the rate of CQI RS LBs may be increased (for example, from every 2 msec to every 1 msec) to provide orthogonal CQI RS gains through TDMA or the maximum scheduling BW may be decreased to provide orthogonal CQI RS gains through FDMA.

An indicative upper bound on the number of possible orthogonal CQI. RS can be obtained by assuming the following for UEs with 10 MHz scheduling BW:
a) RPF=3 and 1 out of 3 combs are assigned to 10 MHz CQI RS.
b) UEs with localized scheduling transmit CQI RS every 4 msec.

Then, for CQI RS LB every 1 msec (8.5% overhead for a fully loaded system) and 12 cyclic shifts, the number of orthogonal CQI RS per 4 msec is 48. As previously mentioned, without considering SU-MIMO or selection antenna diversity, the required number of orthogonal CQI RS is 1200. Assuming that for localized scheduling, the CQI RS transmission rate is 3× that for distributed/persistent scheduling (4 msec versus 12 msec), even if only 1/10 of UEs use 10 MHz scheduling BW (and the remaining use smaller scheduling BWs), only 10% of UEs can have localized scheduling over 10 MHz.

Even though the previous percentage for UEs with localized scheduling was obtained under favorable assumptions, it may be reduced by a factor of 2 if SU-MIMO or selection antenna diversity is applied. It will be reduced by another factor of 2 if the CQI LB RS is every 2 msec to reduce overhead. Also, it will be reduced by another factor of 2 if the CQI RS transmission period is every 2 msec instead of 4 msec to optimize throughput for somewhat larger UE velocities than the smallest possible ones or enable some CQI averaging to improve scheduling accuracy. In any case, in order to meet requirements for the number of orthogonal CQI RS, the previous considered measures result in throughput reductions.

The conventional approach in assigning the cyclic shift value of the ZC sequence to UEs is to have a fixed value, regardless of the UE delay spread, that is selected to accommodate a typically large delay spread (for example, 5 μsec for the TU channel). In typical deployments, UEs experience various delay spreads and the cyclic shift can be adjusted accordingly to increase the number of orthogonal CQI RS that are simultaneously multiplexed over the same BW. FIG. 7 shows an example for the allocation of cyclic shifts, assuming SB CQI RS to limit the FIG. 7 size (this embodiment applies regardless of CQI RS transmission in SBs or LBs). Notice that 9 CQI RS are supported even though the worst case delay spread is 5 μsec implying only 6 cyclic shifts with that value (SB duration is 33.3 μsec). Therefore, for LB transmission, 18 orthogonal CQI RS can be simultaneously multiplexed instead of the 12 that result by always assigning the maximum cyclic shift value (of 5 μsec). Clearly, depending on the delay spreads, the number of orthogonal RS could double (for example, for small delay spreads as the ones encountered in indoor channels).

The cyclic shift allocated to the $m^{th}$ UE is equal to the sum of the largest (estimated at the Node B) timing uncertainties and delay spreads of the previous m−1 UEs. Thus, UE#1 is allocated the original ZC sequence with zero cyclic shift. UE#2 is allocated a cyclic shift equal to the timing uncertainty+delay spread of the first UE. UE#3 is allocated a cyclic shift equal to the timing uncertainty+delay spread of the first and second UEs, and so on. Also, if the ZC sequence length is L and the RS duration is T μsec, a cyclic shift of $T_0$ μsec means a cyclic shift of the ZC sequence by ceil($L*T_0/T$) samples.

The exact cyclic shift value also depends on the ZC sequence length. If the CQI RS sub-carrier spacing is 15 KHz, then for RPF of 3 or 4 the ZC sequence length is respectively 25 or 19 (rounded) samples. Since the LB duration is 66.67 μsec, a cyclic shift of the ZC sequence by 2 samples is equivalent to 5.33 μsec and 7.02 μsec, respectively for RPF 3 or 4. Therefore, while an RPF of 3 can be combined with 12 cyclic shifts, an RPF of 4 can only provide 9 cyclic shifts while maintaining orthogonality for the TU channel. In that sense, an RPF of 3 is preferable to an RPF of 4. If the CQI RS sub-carrier spacing is 7.5 KHz (as previously described), the length of the ZC sequence also doubles. Then, the analysis above applies but for RPF of 6 or 8 and, for the same reasons as before, an RPF of 6 is preferable. For sub-carrier spacing of 15 KHz and RPF of 3 or for 7.5 KHz and RPF of 6, the cyclic shift granularity is 2.66 μsec (one ZC sample), capturing the direct path, Ricean, the ITU channels of Pedestrian A and Vehicular A, and a maximum of 24 cyclic shifts are possible.

Therefore, on average, the number of cyclic shifts for orthogonal CQI RS can be increased by a factor of about 1.5 by applying the cyclic shift as required by the delay spread and timing error each UE experiences and not by always assigning the maximum cyclic shift regardless of the UE's need.

An alternative to having the cyclic shift being UE specific and ease UE multiplexing, is to have the same cyclic shift for all UEs but adjusting it to the operating environment. For example, a small cyclic shift value can be used in environments with low channel delay spread, such as indoor or urban environments or micro-cells, while a large cyclic shift value can be used in environments with large channel delay spread, such as sub-urban environments or macro-cells. Then, the cyclic shift value is UE-common but Node B or cell-specific and can be communicated to the UEs for example through a broadcast channel.

Embodiments of the invention regarding the co-ordination of the CQI RS transmission from various UEs having various CQI RS BW and transmission rates are now considered. FIG. 8 shows an exemplary partition of 5 MHz operating BW during the CQI RS transmission instance N 840 into 3 scheduling BWs of 1.25 MHz 810, 2.5 MHz 820, and 5 MHz 830 which is achieved with RPF of 3. The same concept can be extended in a straightforward manner to 10 MHz operating BW and scheduling BWs of 1.25 MHz, 5 MHz, and 10 MHz. In each comb spectrum (850 at 1.25 MHz, 860 at 2.5 MHz, and 870 at 5 MHz), the number of orthogonal CQI RS is specified by the number of possible cyclic shifts which depends on whether the maximum cyclic shift is always assigned to all UEs regardless of the respective delay spreads or if the cyclic shift assigned to a UE is specified according to the UE's need as previously described in the corresponding embodiment of the invention.

In one embodiment of the invention, in order to substantially achieve the frequency diversity of the entire operating BW, the CQI RS may hop across scheduling BWs during successive CQI RS transmission instances especially for the small scheduling BWs. This will provide scheduling gains for low speed UEs, some frequency selectivity for "flat" channels and, for pseudo-random hopping patterns across scheduling BWs, interference randomization. It will also enable the Node B to obtain a CQI estimate over the entire operating BW which can be used in applying CQI-based transmission power control on DL signaling, such as control signaling, especially if the UE has only UL data transmission (and no DL data reception, other than control signaling, in which case the UE may not report the DL CQI to the Node B).

Interference randomization can also be achieved by switching combs between successive CQI RS transmission periods. For example, during a CQI RS LB, the 1.25 MHz CQI RS may use the combs allocated to the 2.5 MHz or 5 MHz ones during a previous CQI RS LB instance and vice versa. FIG. 9 shows an exemplary application of the previous aspects where during the transmission instance N+1 940, the 1.25 MHz CQI RS 950 are cyclically rotated and the combs for the 5/2.5/1.25 MHz CQI RS (970/960/950) occupy the combs of the 2.5/1.25/5 MHz CQI RS during the previous CQI RS LB (transmission instance N 840 in FIG. 8). An alternative embodiment to having the CQI RS comb hop between successive CQI RS LBs is to have a predetermined comb for the CQI RS of a given BW. For example, the CQI RS with 1.25 BW is always placed in the first comb, the CQI RS with 2.5 MHz BW is always placed in the second comb, and so on. The advantage of the latter approach is that CQI RS interference may often be from CQI RS having the same BW and therefore the low cross-correlation properties of the ZC sequences can be exploited. In case a UE is simultaneously transmitting the CQI RS and data over the same BW, the CQI RS can complement the DM RS for channel estimation and the DM RS can complement the CQI RS for CQI estimation in the RBs the DM RS is transmitted.

The UEs transmitting a CQI RS need not be the same between consecutive CQI RS LBs. For example, for a CQI RS transmission period of 2 msec, a UE in a particular scheduling BW may have a CQI RS transmission period of 4 msec and transmit during the odd CQI RS LBs while another UE with the same scheduling BW and CQI RS transmission period may transmit its CQI RS during even CQI RS LBs. In this manner, UEs with different CQI RS transmission periods can be orthogonally multiplexed in the time domain.

The parameters regarding the CQI RS transmission should be configurable for each UE and updated based on decisions made at the Node B which is aware of all current assignments to the UEs transmitting UL CQI RS. The CQI RS parameters for a reference UE include:
a) ZC sequence
b) transmission BW
c) CQI RS comb and RPF of the ZC sequence
d) transmission period
e) cyclic shift of the ZC sequence
f) transmission power CQI RS ZC Sequence The ZC sequence may not have to be signaled if a unique one is used in every cell. In that case, the ZC sequence may be mapped to the cell identity and be implicitly known to the UE after it acquires the cell identity during the synchronization process.

CQI RS transmission BW

For the CQI RS BW, the BW number should be specified in case there is more than one. For example, in FIG. 8, there are four 1.25 MHz CQI RS BW and a UE assigned to one of them should also be informed of the corresponding number. The assigned BW may be static or have a predetermined time pattern such as a cyclical pattern among the consecutive CQI RS transmission periods (for example, FIG. 8 for CQI RS transmission period N and FIG. 9 for CQI transmission period N+1). For example, a UE with initial assignment to the second 1.25 MHz BW, may transmit the CQI RS in the third, fourth, and first 1.25 MHz BWs in the next first, second and third CQI RS transmission periods, respectively, before it repeats that pattern. Therefore, in the exemplary cases of FIG. 8 and FIG. 9, the control signaling from the Node B to a UE with 1.25 MHz CQI RS BW should include 2 bits to specify one of the four possible CQI RS BWs. Also, instead of being predetermined (cyclical), the previous CQI RS hopping pattern may be a pseudo-random one that repeats over a predetermined time period such as for example a frame comprising of 10 sub-frames (a sub-frame structure is shown in FIG. 1). It is possible to avoid explicit signaling of this pseudo-random pattern by mapping it to the cell identity. Then, the UE may derive the CQI RS BW to use in CQI RS LBs, from the initial assignment, the pseudo-random hopping pattern, and the frame timing (sub-frame number) which, like the cell identity, is acquired during synchronization. The UE implicitly determines the number of possible CQI RS BWs based on its assigned CQI RS BW and the operating BW which is also determined by the UE during the synchronization process.

CQI RS Comb and RPF of the ZC Sequence

The RPF of the ZC sequence is not signaled if it is predetermined and unique. For example, in FIG. 8, since 3 possible combs exist, it may be predetermined that the 1.25 MHz BW uses the first comb, the 2.5 MHz BW uses the second comb, and the 5 MHz BW uses the third comb. However, in case there are multiple combs for each CQI RS in a scheduling BW, the comb number should be signaled. An exemplary case is shown in FIG. 10 where six combs exist per CQI RS transmission BW (for example, combs 10A, 10B, 10C, 10D, 10E, and 10F in the second 1.25 MHz BW) and the CQI RS for each of the possible BWs is transmitted on one of two possible combs. In that case, one signaling bit is required to specify the comb.

Similarly to the case of multiple CQI RS BWs, the comb assignment may be static for the entire duration of CQI RS transmission, it may have a cyclical pattern (alternating among the possible combs during CQI RS transmission periods in a sequential fashion), or it may have a pseudo-random pattern which may be derived from the cell identity and the sub-frame number or specified in the same manner as for the CQI RS transmission BW. Moreover, between successive CQI RS transmission periods, different combs may be used for different scheduling BWs as shown in FIG. 9. A combined hopping pattern, whether pseudo-random or predetermined, between the CQI RS transmission BW and the comb used for the CQI RS transmission may also be used to maximize interference randomization.

CQI RS Transmission Period

The CQI RS transmission period is specified to the UE through Node B signaling. It conveys the period of the CQI RS transmission, such as for example every 4 UL sub-frames, and possibly the sub-frame of the first transmission (for example, the second sub-frame of a frame comprising of ten sub-frames) if multiple such sub-frames exist (for example, the first sub-frame may have been another option). In the previous example, the UE transmits the CQI at the second, sixth and tenth sub-frame of a frame comprising of ten sub-frames. As all other parameters, it can be reconfigured through additional signaling and no other issues exist.

Cyclic Shift of the ZC Sequence

The cyclic shift of the ZC sequence should be signaled by the Node B to the UE. The cyclic shift value may be a fixed one corresponding to orthogonality protection from a large delay spread the UE may experience. Alternatively, to maximize the number of cyclic shifts and therefore the number of orthogonal CQI RS, the Node B should specify the cyclic shift based on the delay spread estimate, and possibly a timing error estimate, for the reference UE. In all cases, the assigned cyclic shift value to a UE is the cumulative one of previous cyclic shift values assigned to other UEs for the same ZC sequence, the same CQI RS transmission BW, and the same comb (sub-carrier) in the transmission BW.

CQI RS Transmission Power

As the CQI RS uses a ZC sequence which has low PAPR/CM and the CQI RS uses lower modulation order than possible for the data which also leads to lower PAPR/CM, the CQI RS transmission power can be increased relative to the data (regardless of whether a simultaneous data transmission exists or not). For UEs in poor SINR conditions, this will result to a better CQI estimate. For UEs in good SINR conditions, a good CQI estimate may be easily available in which case the CQI RS may be transmitted with reduced power relative to the data. Moreover, the Node B may take overall interference considerations into account when adjusting the CQI RS transmission power which is signaled to the UE. Nevertheless, explicit signaling of the CQI RS transmission power may not be performed and instead a UE can transmit the CQI RS with a power offset relative to the data transmission that is predetermined based on the scheduling BW. For example, UEs with small scheduling BWs may transmit the CQI RS with larger power than UEs with large scheduling BW in order to improve the CQI estimation.

Finally, the Node B may configure the CQI RS LB period and the size of CQI RS transmission BWs as system parameters change. For example, as the system load increases, the CQI RS LB period may increase (for example, from every 4 msec to every 2 msec). Also, if most UEs are in poor SINR conditions, the CQI RS transmission for the largest scheduling BW (5 MHz in the example of FIG. 2) may be replaced with multiple CQI RS transmissions of correspondingly smaller scheduling BWs. Nevertheless, these modifications by the Node B need not be signaled to the UEs and can be transparent.

Many other modifications and other embodiments of the invention will come to mind to one skilled in the art to which this invention pertains having the benefit of the teachings presented in the foregoing descriptions, the associated drawings, and claims. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

In case of multi-antenna transmission, multiple antennas of a singe UE can be treated as different UEs, for the purpose of allocating reference signals. All herein described designs extend in a straightforward manner to the case of multi-antenna transmission.

All herein described multi-user allocations can be trivially reduced and also applied to the single-user scenario.

What is claimed is:

1. A method, comprising:
receiving in a user equipment a signal from a base station signaling a data transmission power level; and
transmitting from the user equipment a reference signal having a transmission power that is an offset, based upon scheduling bandwidth to the data transmission power level.

2. The method of claim 1 wherein the base station instructs the user equipment to transmit a data signal having parameters determined by the base station based on the reference signal.

3. The method of claim 1 wherein the sequence is based on a constant amplitude zero autocorrelation sequence.

4. The method of claim 1 wherein the base station explicitly signals cyclic shift value through a broadcast channel.

5. The method of claim 1 wherein the base station implicitly signals a cyclic shift value by signaling the identity of the base station.

6. The method of claim 1 wherein the base station uses a first said cyclic shift value and another base station that transmits to the user equipment uses a second said cyclic shift value, the second cyclic shift value being different than the first cyclic shift value.

7. The method of claim 1 wherein the transmission power level is for the transmission of a data signal by the user equipment.

8. The method of claim 1 wherein the reference signal transmission power is determined so that the reference signal is received by the base station with a desired quality measure.

9. The method of claim 8 wherein the desired quality measure is a signal to interference and noise ratio.

10. A method comprising the steps of:
receiving a cyclic shift in a communications signal;
constructing a reference signal by applying said cyclic shift to a sequence, said reference signal having a transmission power that is an offset, based upon scheduling bandwidth, of a transmission power level in a received signal which directs the power level at which data is transmitted; and
transmitting said reference signal.

* * * * *